(12) United States Patent
Amadio et al.

(10) Patent No.: US 7,188,319 B2
(45) Date of Patent: Mar. 6, 2007

(54) DISPLAYING GRAPHICAL INFORMATION AND USER SELECTED PROPERTIES ON A COMPUTER INTERFACE

(75) Inventors: Louis Amadio, Issaquah, WA (US); Chris J. Guzak, Kirkland, WA (US); Todd L. Ouzts, Sammamish, WA (US); Philip P. Fortier, Seattle, WA (US); Suzan M. Andrew, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 504 days.

(21) Appl. No.: 09/832,966

(22) Filed: Apr. 11, 2001

(65) Prior Publication Data
US 2002/0075312 A1 Jun. 20, 2002

Related U.S. Application Data

(60) Provisional application No. 60/198,975, filed on Apr. 21, 2000.

(51) Int. Cl.
*G06F 3/00* (2006.01)

(52) U.S. Cl. .......................... 715/835; 715/837

(58) Field of Classification Search ................ 345/765, 345/838, 744, 764, 835; 715/764, 765, 838, 715/835, 810, 837
See application file for complete search history.

(56) References Cited

U.S. PATENT DOCUMENTS

| | | | |
|---|---|---|---|
| 5,760,770 A | 6/1998 | Bliss et al. | |
| 5,878,410 A | 3/1999 | Zbikowski et al. | |
| 6,043,817 A | 3/2000 | Bolnick et al. | |
| 6,181,342 B1* | 1/2001 | Niblack | 345/635 |
| 6,353,448 B1* | 3/2002 | Scarborough et al. | 345/744 |
| 6,570,587 B1* | 5/2003 | Efrat et al. | 345/723 |
| 6,583,799 B1* | 6/2003 | Manolis et al. | 345/838 |
| 6,590,585 B1* | 7/2003 | Suzuki et al. | 345/719 |
| 7,000,196 B2* | 2/2006 | Kobayashi | 715/810 |

FOREIGN PATENT DOCUMENTS

JP   11-126476   5/1999

OTHER PUBLICATIONS

Poole, Lon, 1999, IDG Books Worldwide, Inc., pp. 11, 82-86, 109, 131, 158-162, 483.*
Poole, Lon, 1999, IDG Books Worldwide, Inc., pp. 80, 81, 130, 132, and 133.*
Poole, Lon, Mac OS 8.5 Bible, 1999, IDG Books Worldwide, Inc, p. 116.*
Patty and Rick Winter, "Using Microsoft Office 95" Second Edition", 1998, QUE, second edition, aa,ab,ac,29,32,54,205.*
J. Cohen, "The Unofficial Guide to the Workplace Shell," Internet Document, Apr. 5, 1992, retrieved Jan. 14, 2003 <http://www.verfasser.de/web/web.nsf/c556800e2846f53e412567d500491904/87576adf0552eb3341256864006cea6a?OpenDocument>.
D. Esposito, "A Brand New Web Look for Your Folders," Microsoft MSDN Online Library, May 1999.

(Continued)

*Primary Examiner*—Raymond J. Bayerl
*Assistant Examiner*—Dennis G. Bonshock
(74) *Attorney, Agent, or Firm*—Banner & Witcoff, Ltd.

(57) ABSTRACT

A new way of providing pertinent information about an item (e.g., a text file, a picture file, a music file, video file, or any other similar file) is provided. The invention provides graphical information about the item along with user-selectable properties that are specific to that item. The invention further provides a way of sorting the items by the user-selectable properties and communicating the sort order to the user. The invention thereby provides the user with a way of quickly finding pertinent information about the item.

18 Claims, 6 Drawing Sheets

OTHER PUBLICATIONS

"Unlimited Text in the Container control," IBM Tech. Disc. Bull., vol. 36, No. 12, Dec. 1993, pp. 141-142.

P. Haggar et al., "Programming the OS/2 Container Control: The Basics," OS/2 Developer, Winter 1993, vol. 5, No. 1, pp. 96-101, retrieved from Internet, <http://hobbes.nmsu.edu/pub/os2/dev/wps/cnrbastx.zip>.

Web Page—Amazon.com: A Glance: B-52's (pp. 1 through 4), Aug. 15, 2000.

Web Page—Barnes&Noble.com Music (pp. 1 through 3), Aug. 15, 2000.

* cited by examiner

DISPLAYING GRAPHICAL INFORMATION AND USER SELECTED PROPERTIES ON A COMPUTER INTERFACE

RELATED APPLICATION

This application claims the benefit of priority of U.S. Provisional Application No. 60/198,975 filed Apr. 21, 2000, the disclosure of which is incorporated by reference.

FIELD OF INVENTION

The present invention relates in general to user interfaces for computer systems, and more particularly to improved techniques for displaying graphical information and important properties on the computer display.

BACKGROUND OF THE INVENTION

It is known that computer operating systems provide a user with an interface to permit the user to communicate directly with the operating system. The user interface is provided by the shell of the operating system and is typically presented in a graphical environment on the computer display. In the graphical environment, icons which represent items on the computer, such as, programs, files or other resources available to the user are often displayed on the computer screen. The term "item" will be used throughout to generally identify the various types of files, programs, or computer resources that may be displayed by the invention. The user may interface with and select a particular icon. The shell will then run the program, open the file, or initiate the operating system service represented by the icon.

It is also known that the user interface provided by the shell may be a menu driven environment in which the user makes selections from a task bar menu located on the computer display. Through navigation of the menu options, a user can locate the desired program, file or operating system service and can launch such item by selecting the menu entry which represents the item.

It is further known that the shell permits the user to sort and arrange the items stored on the computer. By interfacing with the menu bar and selecting from a list of menu entries a different display layout and a different sort order for the item, the user may change the presentation and order of the items on the computer display. By way of example and not limitation, the Windows® 2000 operating system published and sold by Microsoft Corporation provides a menu bar entry titled "View" which includes the following list of sub-menu entries that identify and represent other display layouts for the items presented on the computer display: thumbnails view, icon view (large or small), list view, and details view. In thumbnails view, each item is presented as a small preview representation of the item. In icon view, a miniature graphic representation of the item type and the basic information of the item are displayed. Specifically, a visual or icon representation of the item (either large or small) is displayed along with the name of the item. List view is similar to icon view but with the items displayed in a list format on the computer screen. In details view, an icon representation of the item is displayed along with several properties for the item, including its name, size, file type, author, and revision date.

While these known layouts provide a user with a useful way to review items, no one layout meets every user's needs. Thumbnails, list, and icon views, for example, provide very minimal information about the item making it difficult for the user to identify the item and its properties. Details view, on the other hand, displays numerous properties for the item, typically more information than is required, resulting in wasted space in the view. In addition, details view displays the same properties for each item regardless of the item type. For instance, in details view, the same properties would be displayed for a text file as a music file. Showing the author of the file may be pertinent for a text file but not for a music file. As a result, unimportant information is displayed.

Accordingly, there is still a need for a user interface display of items where only pertinent information about an item is presented to the user. In other words, there is a need for the display of items on the computer screen that strikes a balance between the thumbnails/icon view and the details view. The present invention strikes such a balance by providing a new user interface view that displays a graphical representation of the item along with the pertinent properties for the item, properties that are specific to that type of item. The details of this user interface display are discussed in detail below.

It is known in the art to provide on a user interface display a graphical representation of an item alongside a description of the item. For example, many Internet based retailers display a picture of the items for sale along with a description of the item. Amazon.com, for instance, an on-line bookseller, displays a graphical representation of a book along with the name of the book, the author, and the price. The name of the book usually has an HTML (hypertext markup language) link associated with it to connect the user with another web page on the World Wide Web where the user can order the book and arrange payment. In addition, there is usually an information link associated with the book that hyperlinks the user to another web page to learn more about the book.

These known Internet displays have drawbacks which the present invention overcomes. The known Internet displays are static in that the graphical representations of the item are scanned onto the computer display and thus do not change. In addition, the information about the item cannot change through user interface with the item. That is, the user cannot change the information to be displayed about the item. Moreover, the user cannot open the item without having to navigate through several screens or web pages.

SUMMARY OF THE INVENTION

Accordingly, it is an object of the present invention to overcome the aforementioned drawbacks with existing user interface displays. It is another object of the invention to display concise useful information about an item. It is a further object to provide information about an item that is specific to that type of item. It is yet another object of the invention to provide easy identification of an item together with relevant properties for that item. Still a further object of the present invention is to provide a user interface display that dynamically changes as changes are made to the item. Another object is to provide a user interface display where the user can change the arrangement of the displayed properties of an item.

In one embodiment, the present invention comprises a user interface view that provides the user with information about an item, and more particularly, information that is specific to that item. The invention includes the use of tiles, which are frames that are displayed on a window and that include a plurality of slots to dynamically display the pertinent information about the item, such as the item type, item name and other relevant properties of the item. In one aspect of the invention, the tile for a file type may include the use of three slots to represent and identify the file—one slot to display a graphical representation of the file type, and two slots positioned to the right of the graphical representation to display the name and the relevant properties of the file. Each item type will have its own unique graphic identifier and will have properties that are specific for that item. According to the invention, the tiles may be sorted by name or other relevant properties (e.g., date, size, and type) with the sort order of the tiles being communicated to the user along with the requested sort property displayed in a slot in the tile. Moreover, the use of slots permits long file names to be displayed without truncation. The invention thus permits the user to quickly find pertinent information about an item and permits the user to arrange the items in a desired order.

The full range of objects, aspects and advantages of the invention are only appreciated by a full reading of this specification and a full understanding of the invention. Therefore, to complete this specification, a detailed description of the invention follows, after a brief description of the drawings.

BRIEF DESCRIPTION OF THE DRAWINGS

The invention will be described in relation to the accompanying drawings. In the drawings, the following figures have the following general nature.

DESCRIPTION OF THE INVENTION

Figure 1:
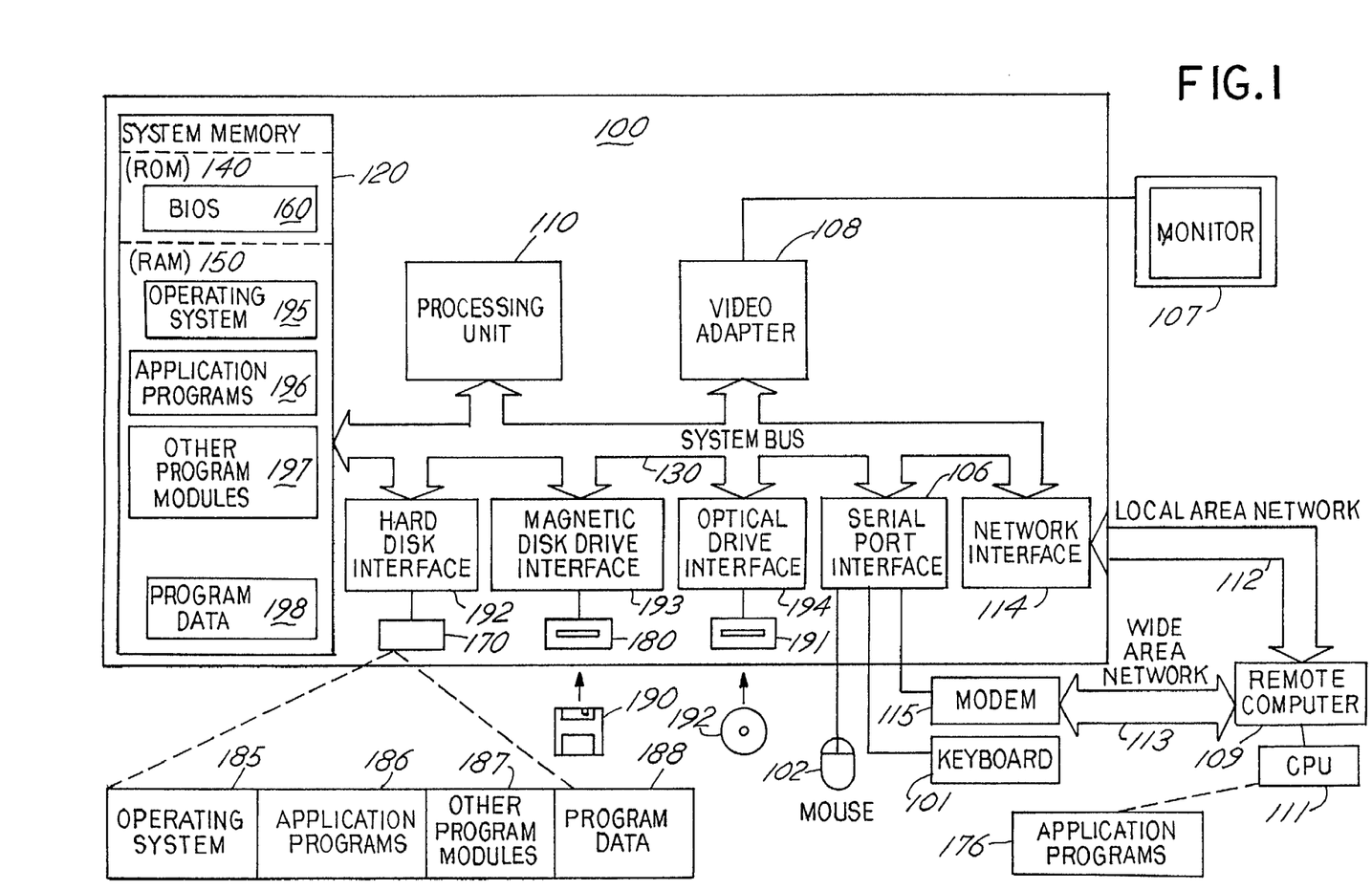
FIG. 1 is a block diagram of a computer for use with the present invention.

Referring to the drawings wherein like numerals indicate like elements, there is shown in FIG. 1 an example of a suitable computing system environment 100 on which the invention may be implemented. The computing system environment 100 is only one example of a suitable computing environment and is not intended to suggest any limitation as to the scope of use or functionality of the invention. The invention is operational with numerous other general purpose or special purpose computing system environments including, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The present invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network.

With reference to FIG. 1, an exemplary system for implementing the invention includes a general-purpose computing device in the form of a computer 100. Components of computer 100 may include, but are not limited to, a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures.

Computer 100 typically includes a variety of computer readable media. Computer readable media can be any available media that can be accessed by computer 100 and includes both volatile and nonvolatile, removable and non-removable media implemented in any method or technology for storage of information such as computer readable instructions, data structures, program modules or other data. The system memory 120 includes computer storage media in the form of volatile and/or nonvolatile memory such as read only memory (ROM) 140 and random access memory (RAM) 150. A basic input/output system 160 (BIOS) is typically stored in ROM 140. RAM 150 typically contains data and/or program modules that are immediately accessible to and/or presently being operated on by processing unit 110. By way of example, and not limitation, FIG. 1 illustrates operating system 195, application programs 196, other program modules 197, and program data 198.

The computer 100 may also include other removable/non-removable, volatile/nonvolatile computer storage media. By way of example only, FIG. 1 illustrates a hard disk drive 192 that reads from or writes to non-removable, nonvolatile magnetic media, a magnetic disk drive 193 that reads from or writes to a removable, nonvolatile magnetic disk 190, and an optical disk drive 194 that reads from or writes to a removable, nonvolatile optical disk 192 such as a CD ROM or other optical media. The hard disk drive 192 is typically connected to the system bus 130 through a non-removable memory interface such as interface 170, and magnetic disk drive 193 and optical disk drive 194 are typically connected to the system bus 130 by a removable memory interface, such as interfaces 180, 191, respectively.

The drives and their associated computer storage media discussed above and illustrated in FIG. 1, provide storage of computer readable instructions, data structures, program modules and other data for the computer 100. In FIG. 1, for example, hard disk drive 192 is illustrated as storing operating system 185, application programs 186, other program modules 187, and program data 188. Note that these components can either be the same as or different from operating system 195, application programs 196, other program modules 197, and program data 198. A user may enter commands and information into the computer 100 through input devices such as a keyboard 101 and pointing device 102, commonly referred to as a mouse, trackball or touch pad. These and other input devices are often connected to the processing unit 110 through a serial port interface 106 that is coupled to the system bus, but may be connected by other known interface and bus structures. A monitor 107 or other type of display device is also connected to the system bus 130 via an interface, such as a video adapter 108.

The computer 100 may operate in a networked environment including a local area network (LAN) 112 and a wide area network (WAN) 113 using logical connections to one or more remote computers, such as a remote computer 109. The remote computer 109 may be a personal computer, a server, a router, a network PC, a peer device or other common network node, and typically includes many or all of the elements described above relative to the computer 100, although only a central processing unit (CPU) 111 has been illustrated in FIG. 1. When used in a LAN networking environment, the computer 100 is connected to the LAN 112 through a network interface or adapter 114. When used in a WAN networking environment, the computer 100 typically includes a modem 115 or other means for establishing communications over the WAN 113, such as the Internet. It will be appreciated that the network connections shown are exemplary and other means of establishing a communications link between the computers may be used.

Figure 2:
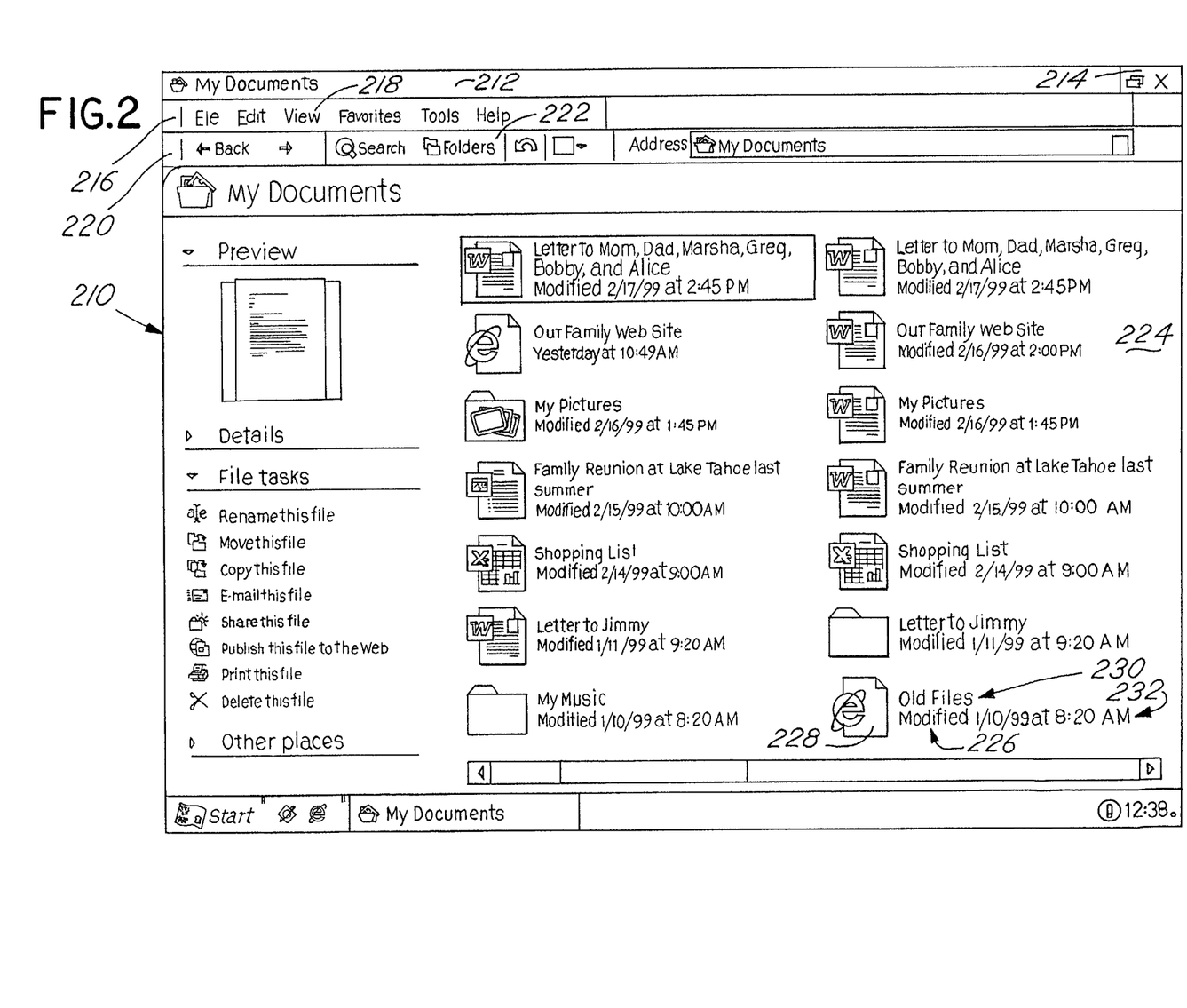
FIG. 2 is a folder view display of the present invention presented by the operating system shell.

Referring to FIG. 2, there is provided an illustrative depiction of a folder view display 210 of the present invention presented by the computer 100, and more particularly, the shell of the operating system. The folder view display 210, which is typically provided in a graphical environment such as the graphical user interface presented by the Windows® operating system, displays the items that are stored in the folder on the computer. The display 210 includes a title bar 212 which is positioned at the top of the display and identifies, by way of example only, the particular window "My Documents." Also positioned at the top right corner of the display is a command icon 214 which includes the well-known maximize, minimize, and close options. Positioned below the title bar 212 is a menu bar 216. As is known in the art, the menu bar 216 includes a number of expandable menus including: File, Edit, View, Favorites, Tools, and Help expandable menus. As the present invention pertains to the View menu 218 and the contents of the View menu, the remaining expandable menus, which are well known with present operating system shells, will not be discussed in further detail.

Figure 3:
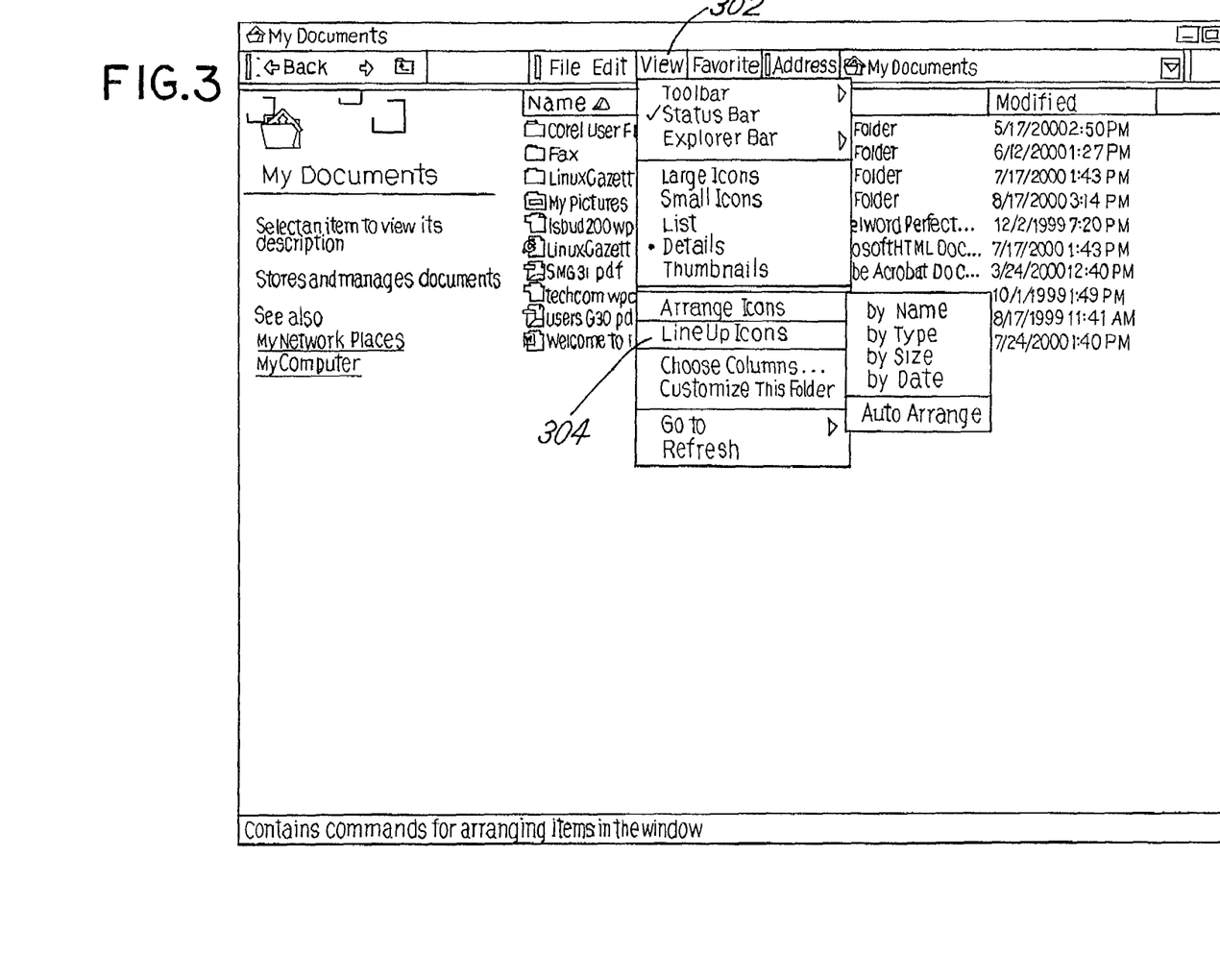
FIG. 3 is a view of the "View" pull-down menu of known folder displays.

As depicted in FIG. 3, when a user selects the View menu 302 from the menu bar, the shell receives the selection signal from the user and will display menu interface 304 typically in the form of a list of several sub-menu entries that identify and represent other display layouts for the items. By way of example only, the Windows® 2000 operating system published and sold by Microsoft Corporation provides the following known sub-menu entries each of which displays the items stored on the system in a different manner on the screen: large icons, small icons, list, details, and thumbnails views. As is known in the art, in the large and small icon views, a graphical representation of the item type along with the name of the item are displayed. The icons are typically arranged in an array on the window. In list view, graphic representations of the item type and the item name are displayed in a list format on the window. Details view displays graphic representations of the item type along with several properties for the item, including, for example, the item name, size, file type, and revision date. Like list view, details view arranges the items in a list format on the window. Finally, thumbnails view displays a graphical preview of the item. As depicted by menu interface 304, the View menu further includes the sub-menu entry "Arrange Icons" which gives the user the option of sorting the displayed items by name, type, size, or date, discussed below.

Returning to FIG. 2, positioned below the menu bar 216 on the display 210 is a tool bar 220 which provides the user with direct access to certain folder view operations. As is known in the art, the tool bar icons 222 facilitate the selection of an operation represented by the icon without accessing the menu bar 216. For example and not by way of limitation, the icons 222 on the tool bar permit the user to do such things as move between folder view displays, select the drop down list control to navigate to a desired folder, or select between the back and forward history controls to move backwards and forwards through a history of previously navigated folders. Other icons for facilitating the operation of other systems functions are known in the art and may be located on the tool bar 220.

Located below the tool bar 220 is a main display portion 224 of the folder view window 210. The main display 224 depicts a new view according to the invention, hereinafter called tile view. As exemplified in FIG. 4, to activate tile view, a user must select the "Tiles" sub-menu entry under the View menu from the new menu user interface 402. The shell, which receives the user's request to execute tile view, begins a routine, discussed below, for displaying from a default directory the information to be displayed in tile view.

Referring back to FIG. 2, tile view provides a new graphical user interface comprising a plurality of tiles 226 positioned in an array on the window. Each tile 226 provides an icon 228 representing the type of item in the folder, and rows of text located alongside the icon 228. The rows of text include a first row 230 which provides the name of the item and a second row 232 which provides relevant properties about the item, properties which are specific to that type of item. As shown in FIG. 2, the second row 232 conveys to the user the manner by which the tiles are sorted. It should be understood by those of skill in the art that the order and arrangement of the rows of text may vary and that the depicted order is just one embodiment of the present invention.

Figure 5:
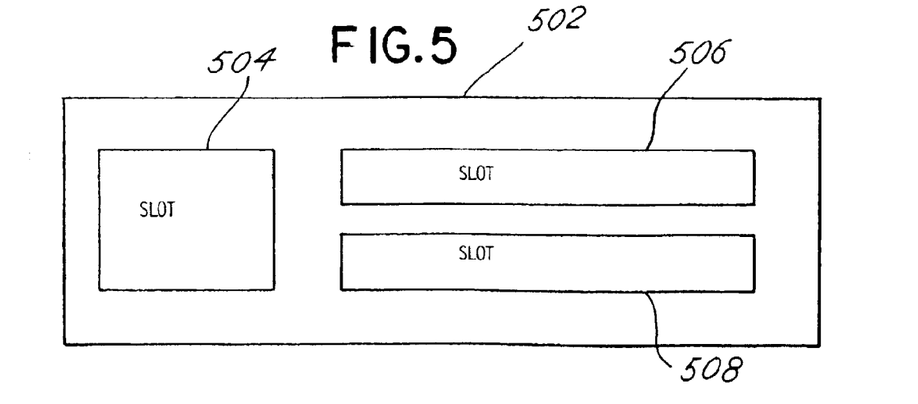
FIG. 5 is a representative "tile" of the invention of FIG. 2.

Referring to FIG. 5, the tile 226 consists of a frame 502 which is a defined boundary or perimeter on a graphic user interface within which is typically placed graphical representations for resources on the operating system. The area within the boundaries of the frame 502 is composed of slots 504, 506, 508. As exemplified in FIGS. 2 and 5, placed within the slots 504, 506, 508 are the graphical icon 228, the first row of text 230, and the second row of text 232, respectively. It should be understood by those of skill in the art that while the present invention may include three slots, more or less than three slots may be used to represent and identify an item in the folder. It should be further understood that the present invention is not limited to the depicted frame arrangement as other frame arrangements will be known to those skilled in the art in view of the illustrated example.

In an exemplary embodiment, placed within slot 506 is the name of the item represented by the tile. As shown in FIG. 2, the name can consist of numerous characters to permit the use of longer names to more accurately define the item. Longer names are possible because of the slot 506 which allows the name to wrap to a second line without truncation. As is known in the art, the name of the item may be edited by the user by highlighting the text of the name.

Placed within slot 508 are the relevant properties of the item. Significantly, with the present invention the relevant properties that are displayed in slot 508 are specific to that item type. That is, depending on the item type, different properties will be displayed in slot 508. By way of example, text row 232 displays the revision date which is an exemplary property for a text file. Other properties that may be displayed within slot 508 for a text file include, but are not limited to, the author's name, the size of the document, the item type, the revision date, or any other suitable property that may identify a text file. As for other types of items, the present invention can display the relevant properties for those item types as well. By way of example only and not limitation, a folder containing pictures or still images in JPEG (Joint Photographic Experts Group), GIF, BMP (Windows bitmap) or similar file formats, the relevant properties that may be displayed by the present invention include name, size, type, the date the picture was taken, revision date, dimensions, or any other suitable property that is relevant to identify a picture. For a folder containing music in WAV (wave), MIDI, MP3, or similar music formats, the properties that may be displayed include name, size, type, artist, year, album, track, length, or any other suitable property that would identify a music file. For videos in MPEG (Motion Picture Experts Group) or similar video formats, it is contemplated that the properties that may be displayed include name, size, type, revision date, length, dimension, or any other relevant video properties. For documents or pages, including text, images, video and sound downloaded from the World Wide Web of the Internet, it is contemplated that the properties that may be displayed may include, but are not limited to the similar properties set forth above for the respective item type. It will be understood by those of skill in the art that the above item types are only representative of the numerous types of items that may be displayed by the shell of the present invention. One of skill in the art will further understand that the list of relevant properties in the above item type examples is not intended to be exhaustive. Rather, other properties that are specific to the item type may be used in accordance with the present invention.

Figure 4:
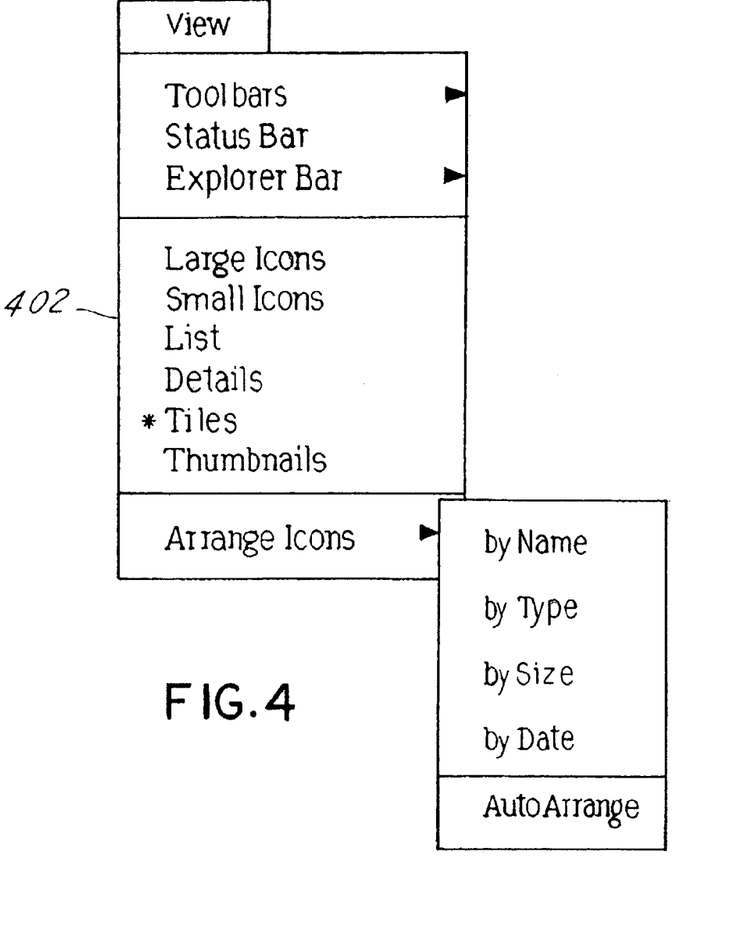
FIG. 4 is a view of the "View" pull-down menu of the folder view display of the invention of FIG. 2.

Referring to FIG. 4, the slots within the frame may be sorted by a set of sort properties. The sort properties define a criterion for ordering the tiles on window. It is known in the art that the sort properties may include by Name, by Type, by Size, or by Date. The Name sorting method arranges the tiles by name in alphabetical order. The Type sorting method arranges and groups the tiles based on the type of file (i.e., a text file, or a music file). The Size sorting method orders the tiles according to the amount of memory occupied by the associated file. The Date sorting method orders the tiles according to the date on which the file was generated or revised. By selecting one of these sort properties, the user may sort the tiles and display the sort order on the window. The selected sort property may be displayed in one of the slots on the tile to provide the user with a quick identification of the sort order. In addition to the known sort properties, the present invention may be used with other type specific sort properties, such as, revision date, length, dimensions, album, artist, year, track, author, date picture taken, and any other property that may be useful to identify an item type.

With the present invention, the item represented by the tile may be opened or executed by the user clicking on or hovering over any portion of the frame 502 with a pointing device such as a mouse. Also with the present invention, when changes are made to the item, those changes are dynamically reflected in the graphic representation or properties displayed in the slots. As an example, if the display of the tile includes the revision date of the item, the revision date will be dynamically updated and reflected on the tile after changes are made to the item.

Figure 6:
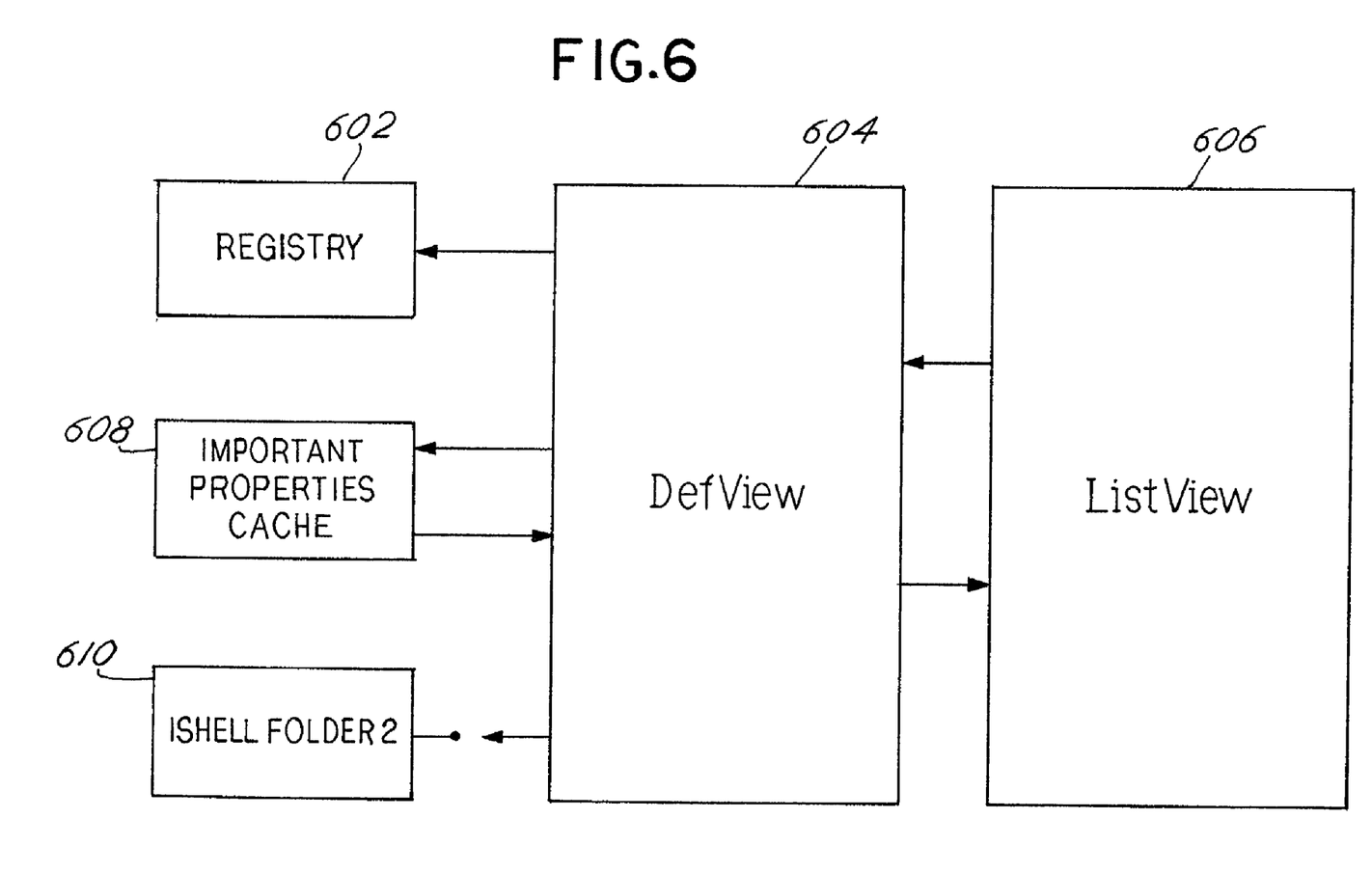
FIG. 6 is a block diagram of the architecture of the invention of FIG. 2.

Referring to FIG. 6, there is shown a diagram of an exemplary system for implementing the present invention and for dynamically providing the most relevant properties for the item type. As depicted in FIG. 6, there are three components of the computer operating system which are used for the implementation of the present invention: a registry 602, a default view implementation referred to as DefView 604, and a ListView control 606 for displaying the information on the window. The registry 602 is the component of the operating system which serves as a directory to store the pertinent information relating to the specific properties of an item. By way of example and not limitation, the registry 602 may store the following properties for a text file: author, title and revision number. The ListView control 606 is the part of the operating system that displays the information about each item on the window. As is known in the art, the ListView control 606 displays the items in either icon view, thumbnails view, list view or details view on the folder view window. With the present invention, the ListView control 606 now may display the items in tile view. The DefView 604 is the component that ties the ListView control with the computer's file system or more specifically, the shell namespace. DefView 604 will supply ListView with information about the shell namespace in terms that the ListView control can understand.

Referring to FIG. 6, to implement the present invention, new members have been added to the ListView control. Specifically, the members UINT cColumns and PUINT puColumns have been added to the LVITEM structure that is used to describe each ListView item. Together these members describe which properties to show in the tile for that particular item. The members cColumns and puColumns can be set (by a "client" of ListView, in this case Defview 604) either when describing the entire item by using the LVM_SETITEM message with an LVITEM structure, or with the new LVM_SETTILEINFO message, which takes a LVTILEINFO structure:

```
typedef struct tagLVTILEINFO
{
    UINT cbsize;          //size of this structure (used to
                          assure validity)
    int iItem;            //which item to set the tile infor-
                          mation for
    UNIT cColumns;        // the number of properties to
                          display for this item
    PUINT puColumns;      // a list, of length cColumns,
                          of property identifiers
} LVTILEINFO, *PLVTILEINFO;
```

In an exemplary embodiment, the cColumns member in the LVITEM or LVTILEINFO structure is set to I_COLUMNSCALLBACK, indicating that the information to display in each tile is not immediately available, and that when the time comes for the ListView control 606 to display this information, it needs to request the information from its client, in this case DefView 604. Setting the cColumns field for each item to I_COLUMNSCALLBACK is beneficial because the tile information needs to be extracted from the registry 602 which can be a slow operation and therefore should only be extracted when required. By way of illustration, when a folder is opened and DefView 604 adds items that represent files/resources on the user's computer to ListView 606, the cColumns field for each item is set to I_COLUMNSCALLBACK. After a user interfaces with the View menu and switches the display of the items on the window to the tiles view, ListView recognizes that the value for cColumns is I_COLUMNSCALLBACK, indicating that ListView must request the tile information from its client, in this case DefView 604. ListView 606 requests the tile information through the LVN_GETDISPINFO notification message. Because the request to retrieve the tile information is a slow operation as DefView 604 must extract the information from the registry 602, DefView 604 will answer the request by indicating that there are zero properties to display (since ListView is in the process of drawing the items on the screen, and thus needs at least some kind of information immediately), and then start a task that will extract the relevant information from the registry 602. When the information is located in the registry 602 and extracted from the registry, DefView 604 will send a LVM_SETTILEINFO message to the ListView 606 control along with the retrieved tile information. The tile information (consisting of which properties to display for a particular item) will then be stored in ListView 606. Now that ListView 606 knows which properties to display, it must retrieve the values of the properties. If the value for a particular property on an item is not yet stored in ListView 606, ListView 606 will send a LVN_GETDISPINFO notification message to its client (in this case DefView 604) requesting the particular property value for this item. DefView 604 may return the requested property value immediately, or, as was done similarly in the case with requesting the tile information, an empty text string may be returned for temporary use, and DefView will send the information to ListView 606 at a later time at which point it will be stored in the ListView 606 and the display updated.

Figure 7:
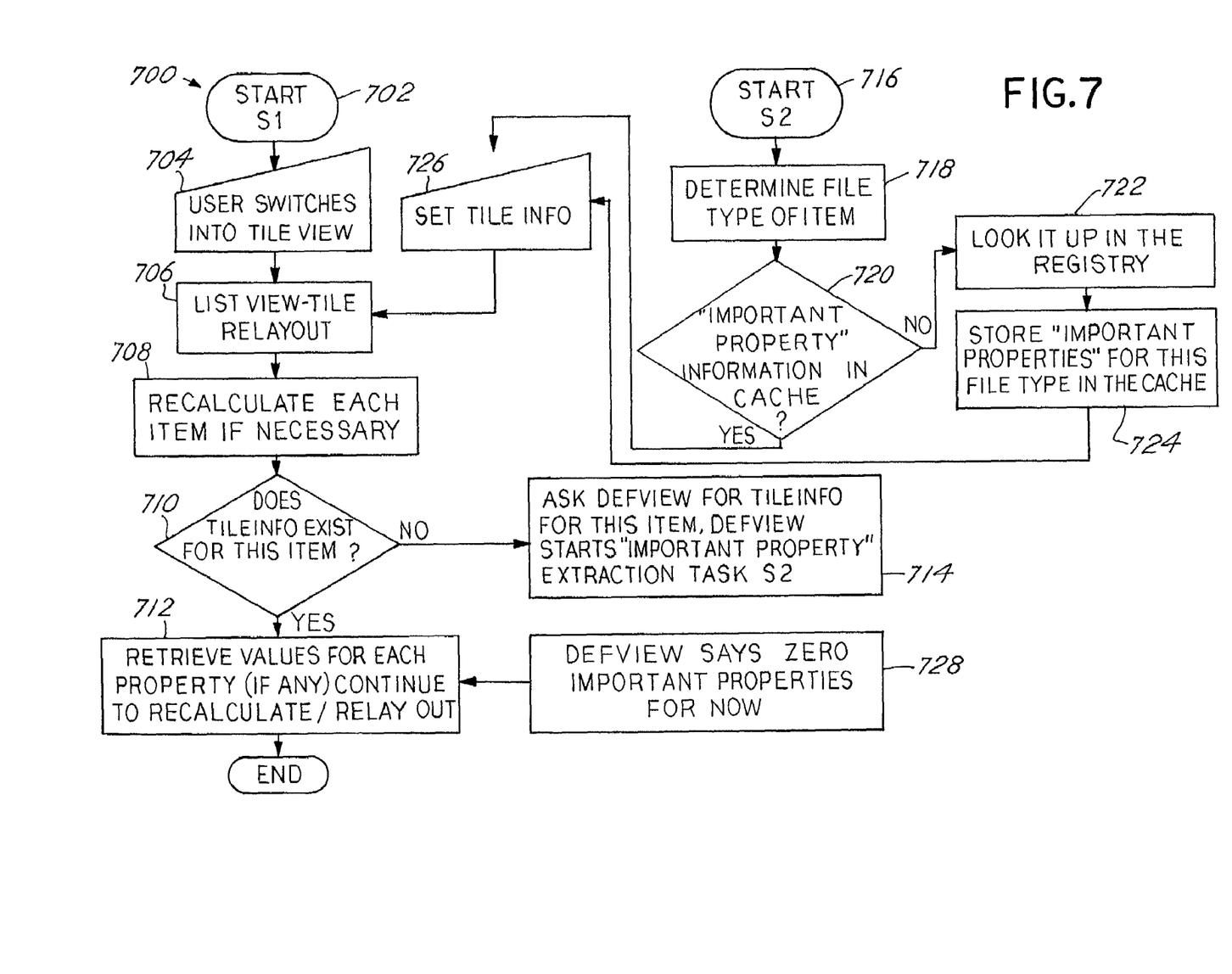
FIG. 7 is a flow diagram illustrating an exemplary method for retrieving and displaying the important properties for a specific item type

Referring to FIG. 7, a flow diagram of the present invention is illustrated and provides an exemplary method of retrieving and displaying the pertinent information about an item in the tile view format. The method 700 begins at step 702 where a user, already viewing a folder that contains, for example, a file entitled "Letter.doc", switches into tile view at step 704 by selecting "Tiles" from the View menu of the menu bar. Upon switching into tile view both the DefView 604 and ListView 606 modes become linked. At steps 706 and 708, ListView will review the stored items and determine which items to relayout or recalculate based on changes to an item's visual metrics. ListView will relayout and recalculate the visual metrics of each item if necessary. At step 710, ListView will check for tile information for each item. If the information is present, then at step 712, ListView will calculate the visual metrics needed to display the item. If the information does not exist in ListView, ListView will request the information from its client, DefView. At step 714, DefView will begin a background task 716 to retrieve the pertinent information for the item. At step 728, DefView will also reply to ListView that there are temporarily zero columns to display for the item until the background task 716 is completed.

The task 716 begins at step 718 with DefView determining the important properties to display for .doc files (e.g., author, title, and revision number). At step 720, DefView first checks whether the important properties are in cache 608, which is known in the art as high-speed memory designed to hold data that is soon to be accessed or was recently accessed. If the important properties for the Letter.doc file are not found in the cache 608, at step 722, DefView looks up the important properties for a Letter.doc file in the registry 602. Once located in the registry, at step 724, DefView will store the important properties for the .doc file type in the cache. At step 726, DefView sends the list of important properties for this item to ListView via the LVM_SETTILEINFO message. At step 706, ListView will attempt to relayout or redraw the important properties for the item. When attempting to relayout, ListView recognizes that there is text or values corresponding to the important properties for the Letter.doc item and retrieves those items or values to display for the user.

Note that the retrieval of the values for the properties may be done synchronously or asynchronously depending on whether the text or values are quickly retrievable. If the text or values are not quickly retrievable, DefView starts a task to retrieve the text or values for the properties. Referring back to FIG. 6, the task for retrieving the text or values can be achieved through DefView's reference to a IShellFolder2 610 implementation. As each task completes, the text or values are sent to ListView via the LVM_SETITEM message. This asynchronous retrieval of the text or values is to ensure that there is no lag in displaying the items when there are numerous items.

As stated above, the registry 602 is used to store the important properties for a particular file type. This data is stored in the TileInfo value under the key for a file class. The form of the data is "prop:<propname1>;<propname2>; . . . <propname-n>." By way of example only and not limitation, if the important properties for a .jpeg file are type and size, the structure will be as follows:My Computer->HKEY_CLASSES_ROOT->jpegfile Value: TileInfo Data: "prop: Type;Size" After DefView requests the important properties for a .jpeg file, the TileInfo string is parsed, and the property names are mapped to SHCOLUMNID identifiers used in DefView. To further improve performance, the series of SHCOLUMNIDs that define the important properties are cached on a per file type basis for future quick retrieval, as depicted at step 724 in FIG. 7. When requested by ListView, DefView will map the SHCOLUMNIDs to the ListView column indices.

It will be recognized that the illustrated embodiments can be modified in arrangement and detail without departing from the scope of the present invention. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiments shown in software may be implemented in hardware and vice versa. Therefore, to particularly point out and distinctly claim the subject matter regarded as the invention, the following claims conclude the specification.

What is claimed is:

1. In an operating system configured to support a plurality of file types, a method for displaying a plurality of files, a first file having a first file type and a second file having a second file type, wherein a set of relevant properties of each file type is stored by the operating system, the method comprising:
   associating by the operating system a first property with the first file type, and storing by the operating system a value corresponding to the first property for the first file;
   associating by the operating system a second property with the second file type, and storing by the operating system a value corresponding to the second property for the second file, wherein the second property is different from the first property, and wherein at least one of the first property and the second property are not user-assignable properties;
   displaying a value stored by the operating system corresponding to the first property of the first file at a location relative to a first graphical representation of the first file; and
   displaying a value stored by the operating system corresponding to the second property of the second file at the same location relative to a second graphical representation of the second file.

2. The method of claim 1, wherein the value corresponding to the first property for the first file and the value corresponding to the second property for the second file are authored by the operating system.

3. The method of claim 1, wherein the first property and second property are not user-assignable properties.

4. The method of claim 1, wherein the set of relevant properties for the first file type is different from the set of relevant properties for the second file type.

5. The method of claim 1, wherein the first and second properties are textual properties.

6. The method of claim 1, wherein the operating system is not configured to store a value corresponding to the first property for any file of the second file type.

7. The method of claim 6, wherein the operating system is not configured to store a value corresponding to the second property for any file of the first file type.

8. One or more computer readable media comprising computer executable instructions which, when executed in on a computer system configured to support a plurality of file types, perform a method for displaying a plurality of files, a first file having a first file type and a second file having a second file type, wherein a set of relevant properties of each file type is stored by the operating system, the method comprising:
  associating by the operating system a first property with the first file type, and storing by the operating system a value corresponding to the first property for the first file;
  associating by the operating system a second property with the second file type, and storing by the operating system a value corresponding to the second property for the second file, wherein the second property is different from the first property, and wherein at least one of the first property and the second property are not user-assignable properties;
  displaying a value stored by the operating system corresponding to the first property of the first file at a location relative to a first graphical representation of the first file; and
  displaying a value stored by the operating system corresponding to the second property of the second file at the same location relative to a second graphical representation of the second file.

9. The computer readable media of claim 8, wherein the value corresponding to the first property for the first file and the value corresponding to the second property for the second file are authored by the operating system.

10. The computer readable media of claim 8, wherein the first property and second property are not user-assignable properties.

11. The computer readable media of claim 8, wherein the set of relevant properties for the first file type is different from the set of relevant properties for the second file type.

12. The computer readable media of claim 8, wherein the first and second properties are textual properties.

13. The computer readable media of claim 8, wherein the operating system is not configured to store a value corresponding to the first property for any file of the second file type.

14. The computer readable media of claim 13, wherein the operating system is not configured to store a value corresponding to the second property for any file of the first file type.

15. In an operating system, a method of displaying a plurality of files, comprising:
  assigning by the operating system a first memory location for storing a value of a first enumerated property, associated with a first file of a first file type;
  storing in the first memory location a value corresponding to the first enumerated property for the first file;
  assigning by the operating system a second memory location for storing a value of a second enumerated property, associated with a second file of a second file type, wherein said second file type is different from a first file type, and wherein the second enumerated property associated with the second file type is different from the first enumerated property associated with the first file type;
  storing in the second memory location a value corresponding to the second enumerated property for the second file;
  retrieving the value corresponding to the first enumerated property for the first file from the first memory location and the value corresponding to the second enumerated property for the second file from the second memory location;
  displaying a graphical representation of the first file concurrently with a graphical representation of the second file, wherein data corresponding to the first enumerated property for the first file is displayed at a location relative to the graphical representation of the first file, and wherein data corresponding to the second enumerated property for the second file is displayed at the same relative to the graphical representation of the second file;
  wherein at least one of the first enumerated property and the second enumerated property are not user-assignable properties.

16. The method of claim 15, wherein the first memory location comprises an assigned registry value associated with the first file.

17. One or more computer readable media comprising computer executable instructions which, when executed on a computer system, perform a method for displaying a plurality of files, the method comprising the steps of:
  assigning by the operating system a first memory location for storing a value of a first enumerated property, associated with a first file of a first file type;
  storing in the first memory location a value corresponding to the first enumerated property for the first file;
  assigning by the operating system a second memory location for storing a value of a second enumerated property, associated with a second file of a second file type, wherein said second file type is different from a first file type, and wherein the second enumerated property associated with the second file type is different from the first enumerated property associated with the first file type;
  storing in the second memory location a value corresponding to the second enumerated property for the second file;
  retrieving the value corresponding to the first enumerated property for the first file from the first memory location and the value corresponding to the second enumerated property for the second file from the second memory location;
  displaying a graphical representation of the first file concurrently with a graphical representation of the second file, wherein data corresponding to the first enumerated property for the first file is displayed at a location relative to the graphical representation of the first file, and wherein data corresponding to the second enumerated property for the second file is displayed at the same relative to the graphical representation of the second file;

wherein at least one of the first enumerated property and the second enumerated property are not user-assignable properties.

18. The computer readable media of claim 17, wherein the first memory location comprises an assigned registry value associated with the first file.

* * * * *